United States Patent
Wang et al.

(10) Patent No.: US 7,788,320 B2
(45) Date of Patent: Aug. 31, 2010

(54) METHOD, DEVICE AND SYSTEM FOR PRODUCING SMALL WINDOW AT CLIENT IN BROADBAND DATA INTELLIGENT NETWORK

(75) Inventors: Yue Wang, Guangdong (CN); Dongdong Hou, Guangdong (CN); Yang Lou, Guangdong (CN); Huachun Zhai, Guangdong (CN); Chao Zhou, Guangdong (CN); Chengfang Zhu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 937 days.

(21) Appl. No.: 11/510,177

(22) Filed: Aug. 25, 2006

(65) Prior Publication Data

US 2007/0055750 A1    Mar. 8, 2007

Related U.S. Application Data

(63) Continuation of application No. PCT/CN2005/000374, filed on Mar. 24, 2005.

(30) Foreign Application Priority Data

Mar. 24, 2004    (CN) .................... 2004 1 0030394
Mar. 24, 2005    (WO) .............. PCT/CN2005/000374

(51) Int. Cl.
    *G06F 15/16*    (2006.01)
(52) U.S. Cl. .................... 709/203; 709/219; 709/217
(58) Field of Classification Search .............. 709/203, 709/219, 217
    See application file for complete search history.

(56) References Cited

U.S. PATENT DOCUMENTS

| 6,240,091 | B1 | 5/2001 | Ginzboorg et al. |
| 6,587,691 | B1* | 7/2003 | Granstam et al. ......... 455/456.1 |
| 2002/0129096 | A1* | 9/2002 | Mansour et al. ............. 709/203 |
| 2002/0152242 | A1 | 10/2002 | Meyer et al. |
| 2003/0191799 | A1* | 10/2003 | Araujo et al. ............... 709/203 |
| 2004/0199667 | A1* | 10/2004 | Dobbins ..................... 709/240 |

FOREIGN PATENT DOCUMENTS

| EP | 1349062 | 10/2003 |
| JP | 2003219197 | 7/2003 |
| KR | 20030043055 | 6/2003 |

* cited by examiner

*Primary Examiner*—George C Neurauter, Jr.
*Assistant Examiner*—Mark D Fearer
(74) *Attorney, Agent, or Firm*—Finnegan, Henderson, Farabow, Garrett & Dunner LLP

(57) ABSTRACT

The present invention discloses a method and a client for producing a small window at the client in a broadband data intelligent service, comprising: pre-setting a first module and a second module; while a user needs to use data service, obtaining, by the first module, the IP address of the client, and sending the IP address and authentication information input by the client to the portal server; upon receiving a past authentication message from the portal server, the first module making the second module to operate; and generating, by the second module, a small window to display the access information of the client and provide the user with operation buttons. Moreover, the present invention also discloses a method a device and a system for generating a user interface for a client terminal in a communication network.

12 Claims, 5 Drawing Sheets

METHOD, DEVICE AND SYSTEM FOR PRODUCING SMALL WINDOW AT CLIENT IN BROADBAND DATA INTELLIGENT NETWORK

CROSS REFERENCES TO RELATED APPLICATIONS

This application is a continuation of International Application No. PCT/CN2005/000374, filed Mar. 24, 2005, which claims priority to Chinese Patent Application No. 200410030394.1, filed Mar. 24, 2004.

FIELD OF THE TECHNOLOGY

The present invention relates to broadband data intelligent network technology, and more particularly to a method and a device for producing small window at a client in a broadband data intelligent network, and also a method and a device for generating a user interface for a client in a communication network. Moreover, the present invention relates to a relating communication system.

BACKGROUND OF THE INVENTION

With the development of intelligent network technologies and broadband technologies, a broadband data intelligent network has emerged. The broadband data intelligent network is able to provide abundant services to users, for instance, a broadband network surfing service, a portal service etc.

FIG. 1 illustrates a basic architecture of the existing broadband data intelligent network. It is shown in FIG. 1 that the broadband data intelligent network includes an Integrated Service Control Center (ISCC), a Broadband Service Access Device (BRAS), a portal server and a database, wherein, the BRAS is connected to the ISCC and the portal server simultaneously, while the portal server is connected with the database. In this case, the BRAS serves to build up a data link between a user client and the portal server, and the ISCC functions equivalent to a service control point of an intelligent network and serves to control authentication, accounting and authorization, and the database serves to save the data used by the portal server.

A small window is set on the user's human-computer interaction interface of an existing client, for instance, a small window set on a computer desktop. In the small window, the access information of the user is displayed, for instance, the information may include the network surfing time and the name of the accessed user. And in the small window, there are also some operating buttons for the user to log in or log off the broadband data network, i.e., the log-in and log-off buttons, with which the user can control his usage of the data service.

A timed handshaking mechanism between the portal server and the small window is generally adopted in the existing technical scheme so that the portal server is able to know the on-line status of the user, i.e., whether the user is on-line or off-line currently. When the user is unable to use the data service due to abnormal interruption of the network, since the timing small window of the browser is unable to send a handshaking message, the portal server can set the on-line status of the user as off-line and send an off-line message to the BRAS, when it detects that handshaking is overtime, so as to avoid the case that the user is unable to use the data service due to network interruption, but accounting of the user continues.

However, since the existing small window is based on browsers, the handshaking mechanism between the small window and the portal server is achieved with a heart beating function of the browser as well. But the small window at the client is often shut on the computer desktop or replaced by other pages due to abnormal operations of the browser, and therefore becomes invisible. In this case, the user is unable to get off-line actively. If the user hopes to get off-line actively, he has to log in the portal server again and pass the authentication. Only after the small window appears once more, the user is able to click the log off button to cut off his connection with the broadband network actively. It is obvious that in this case, the user will encounter much inconvenience.

Additionally, the existing clients adopt cookies to save data in order to save user information and the information for interaction with the server. And it is known that the users are able to access these cookie files without difficulty, therefore, these important data might be deleted accidentally by the user or deleted or modified by network hikers, which badly affects the security of the users in using the data service.

Moreover, the existing portal server adopts some intrinsic mechanisms of the browser to ensure that with each client, only one user is able to log in the portal server, but this kind of processing is complicated and its functions are not stable. And in the case that there are many versions of browsers, errors may occur in processing of the portal server.

And what's more, the existing small window displayed by the broadband data intelligent network is unable to support cluster services, which constrains the applications of the existing method in the steady popularization of the cluster service.

SUMMARY

In view of the above, the present invention provides a method for producing a small window at a client in a broadband data intelligent network. The method includes the following steps:

pre-setting a first module and a second module;

while a user needs to use data service, obtaining, by the first module, the IP address of the client, and sending the IP address and authentication information input by the client to the portal server;

upon receiving a past authentication message from the portal server, the first module making the second module to operate; and generating, by the second module, a small window to display the access information of the client and provide the user with operation buttons.

The present invention further discloses a client for producing a small window in a broadband data intelligent service, which includes:

a first module, for obtaining an IP address of a computer used by a user when the user accesses a portal server;

a second module, for popping up a small window at the client, displaying access information of the user and providing operating buttons for the user in the small window; wherein, after the portal server successfully authenticate the user, the first module triggers the second module to operate.

According to another aspect of the present invention, a method for generating a user interface for a client in a communication network is provided, which includes:

obtaining the IP address of the client, while a user initiating a data service;

sending the IP address and authentication information input by the user to a server; and upon receiving an authentication pass message, generating a user interface used to display the user's access information and provide the user with operation buttons;

wherein the user interface is separated from internet browser.

Moreover, a device for generating a user interface for a client terminal in a communication network is also provided by the present invention, which comprises:

a unit, configured to:
obtaining the IP address of the client terminal, while a user initiating a data service;
sending the IP address and authentication information input by the user to a server; and
upon receiving an authentication pass message, generating a user interface used to display the user's access information and provide the user with operation buttons;
wherein the user interface is separated from internet browser.

Further more, a communication system is also provided, which comprises:
a client, a user can use internet via the client;
a server, connected to the client; and
a unit, configured to:
obtaining the IP address of the client terminal from the client terminal, while a user initiating a data service;
sending the IP address and authentication information imputed by the user to the server;
upon receiving an authentication pass message from the server, generating a user interface used to display the user's access information and provide the user with operation buttons;
wherein the user interface is separated from internet browser.

It can be seen from the above technical scheme that the present invention firstly sets the first module and the second module. When the user desires to access the broadband data intelligent network, the first module triggers the second module to operate after the first module has obtained the IP address and successfully authenticated the user, then the second module generates a small window with the access information of the user and operating buttons for the user displayed in the small window. The present invention implements a small window at the client by the cooperating operation of the first and second module, and this implementation is independent from the operating system and browser, therefore it prevents the problem of the small window generated with the browser in the existing technological solution as it is shut down abnormally or covered, so as to avoid troubling the user while logging in or logging off the network.

DETAILED DESCRIPTION OF THE PREFERRED EMBODIMENTS

A detailed description of the present invention is provided hereinafter with reference to accompanying drawings and specific embodiments.

In an embodiment of the present invention, the existing technological method for achieving small windows at the client with browsers is replaced by a method for achieving the small windows with a cooperating operation of two modules.

Figure 5:
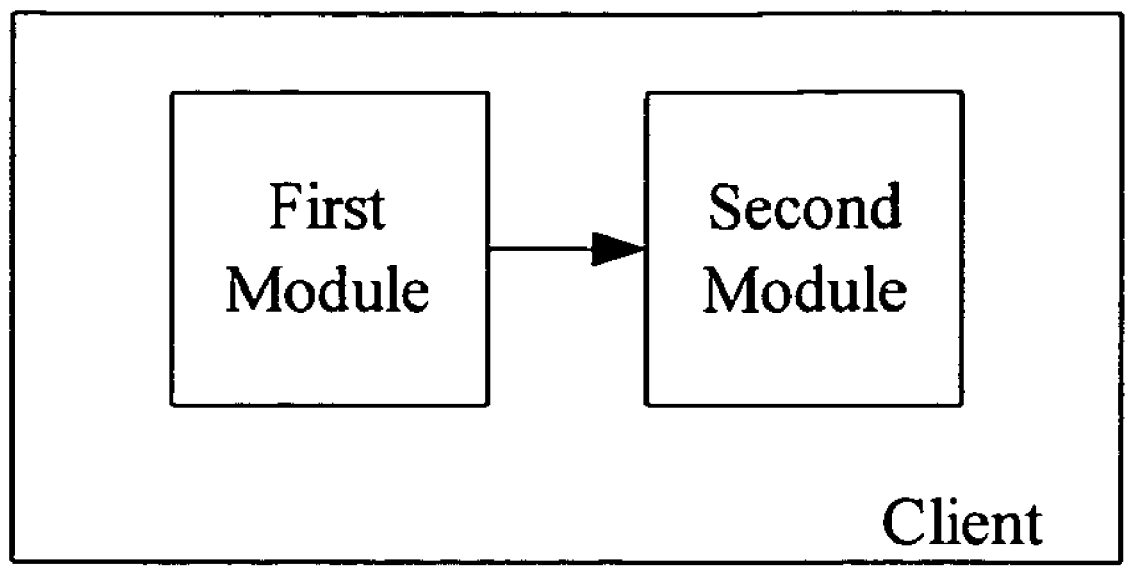
FIG. 5 is a schematic diagram illustrating a client with a first module and a second module according to an embodiment of the present invention.

To be specific, in this embodiment of the present invention, a first module and a second module are set, wherein, the first module serves to obtain an IP address of the computer when the user accesses the portal server, and the second module serves to pop up a small window at the client and displays the access information of the user, for instance, the information of the access status, access time, access type and access name of the user, and operating buttons for the user, which may specifically include "log in the portal server with the access user name", "log in the portal server with other account", "off-line" and etc. In practice, the first module and the second module can both be set in the client. Alternatively, the first module and the second module can be set in different devices separately. FIG. 5 illustrates the structure of the client with the first module and the second module according to an embodiment of the present invention.

Figure 1:
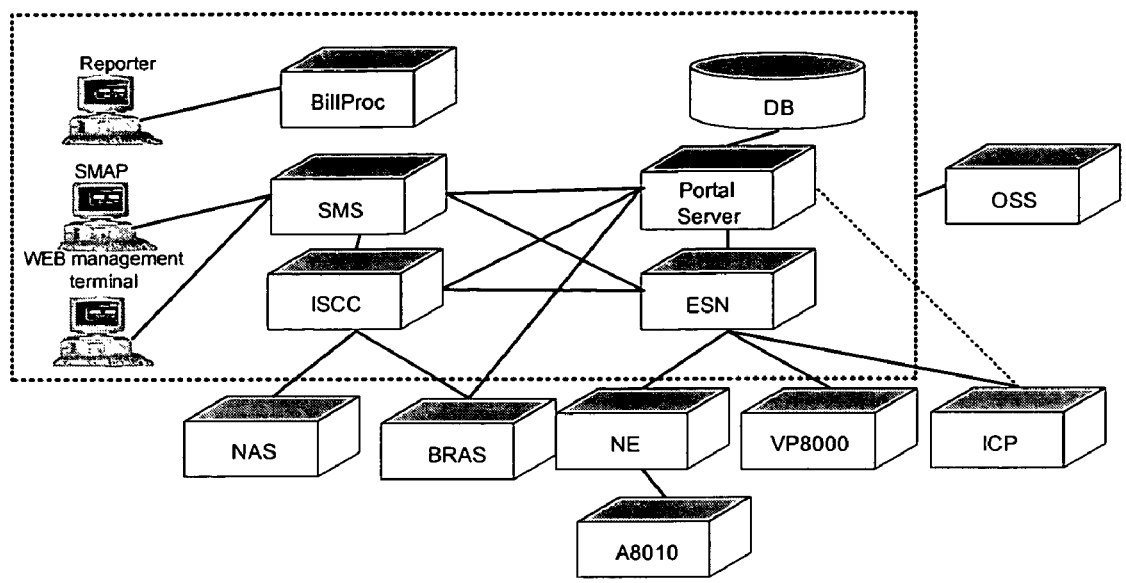
FIG. 1 is a schematic diagram illustrating an elementary architecture of an existing broadband data intelligent network.
Figure 2:
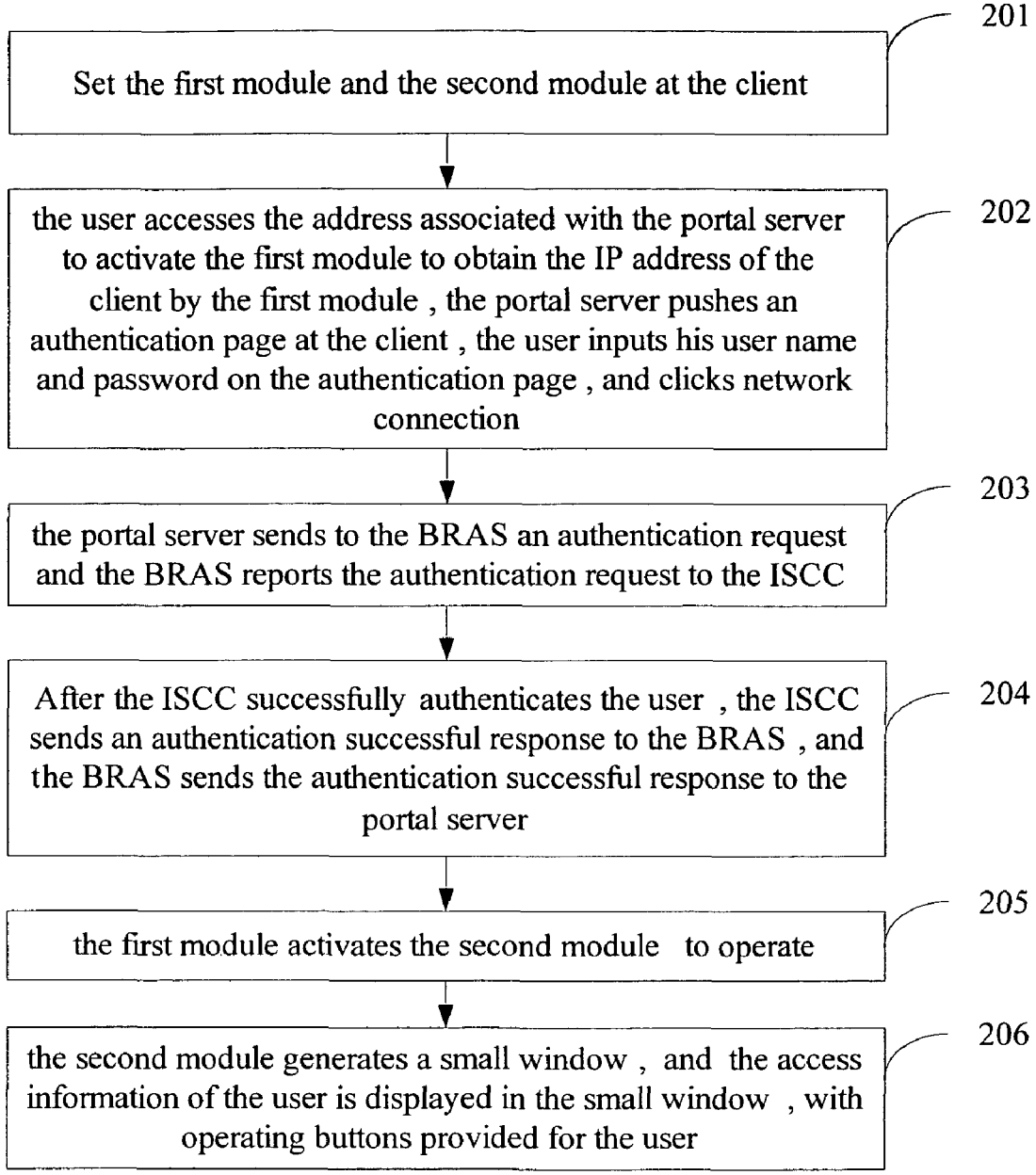
FIG. 2 is a flow chart illustrating a general overflow of an embodiment of the present invention.

A description is given hereinafter to explain how to achieve a small window at the client with the cooperation of the first module and the second module according to the embodiment of the present invention with reference to FIG. 2.

Step 201: the first module and the second module are set at the client; as mentioned above and as shown in FIG. 5, the first module serves to obtain the IP address of the computer when the user accesses the portal server, and after the portal server successfully authenticate the user, the first module triggers the second module to operate; and the second module serves to pop up a small window at the client and display the access information of the user and provides operating buttons for the user in the small window.

Step 202: when desiring to access the broadband data intelligent network, the user accesses the address associated with the portal server to trigger the first module, so as to obtain the IP address of the client by the first module; after the first module obtains the IP address, the portal server pushes an authentication page to the client. The user inputs his user name and password on the authentication page, and then clicks the network connection to request for authenticating whether the user is legal. Here, the user name and password in this case may be generally called authentication information.

Step 203: the portal server sends to the BRAS an authentication request, wherein the user name and password information of the user as well as the IP address information of the client are carried in the request. Thereafter, the BRAS reports the authentication request to the ISCC.

Step 204: the ISCC authenticates whether the user is a legal user according to the user name, password and IP address; if it is a legal user, the ISCC sends an authentication successful response to the BRAS. The BRAS sends the authentication successful response to the portal server thereafter. The portal server sends to the first module at the client a message indicating that the user authentication is successful.

Step 205: upon receiving the authentication successful response from the portal server, the first module triggers the second module to operate and sends to the second module a message indicating that the user has successfully logged in.

Step 206: the second module generates a small window, and displays the small window on the user's computer desktop. At the same time, the access information of the user is displayed in the small window, with operating buttons provided for the user.

Up to now, the method of the present invention successfully achieves a small window at the client, and the method is achieved by the cooperation of the first module and the second module and is independent from the operating system and the browser.

The first module and the second module may be implemented either by circuitry or by software. In the case of implementing the first module and the second module by software, the first module can be a control, for instance, an ActiveX control, and the second module may be a client application. The circuit construction and software development can be accomplished by those skilled in the art according to the spirit of the present invention; therefore no further detailed description will be given.

In the case that the first module and the second module are implemented by software, the software for implementing the first module may be stored in the portal server, the user needs to download and run the software when he accesses the broadband data intelligent network for a first time. And the small window at the client may have functions of automatically checking and updating the version of the software, for instance, the version information is written into a configuration file of the portal server, a control of the first module obtains the version information and compares it with the version at the client. Once it finds that the version at the client is not the latest one, it downloads the latest program from the portal server.

In order to ensure security of the user data, a shared memory for storing the information associated with the data service used by the user may be set in the memory of the client; the first module and the second module are both able to access the shared memory. Here, the associated information in this case includes the information of the user name, the IP address of the computer, the access time, the access mode, and etc.

Alternatively, in Step 202, no authentication page pops up directly when the user logs in the portal server, instead, the first module sends the IP address obtained to the ISCC to request for the user information; if the ISCC determines that the authentication of the user has succeeded, the user can log in the portal server directly; if the ISCC determines that the authentication of the user has failed, the authentication page is generated as mentioned in Step 202. Therefore, in the case when an IP address already has a user accessing the network, no authentication page is generated at the client, that is, no authentication for the user is carried out, and so as to ensure that only one user at one client can be authenticated successfully at one time.

Figure 3:
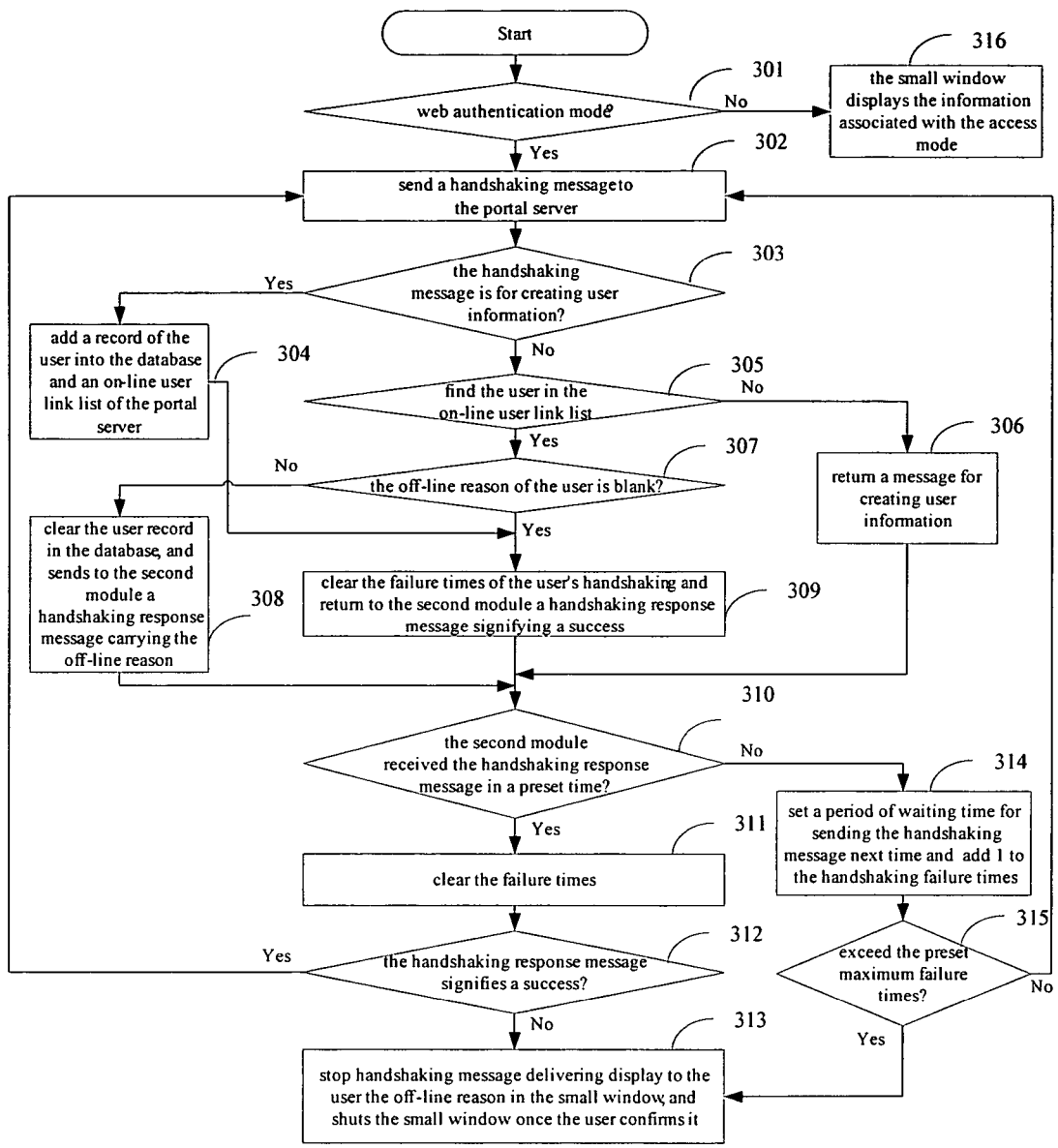
FIG. 3 is a flow chart illustrating the control of a user for using the data service by the small window.

After the small window is activated, the user's usage of the data service may be further controlled via the small window. As shown in FIG. 3, in Step 301, the second module determines whether the user accesses the network in the mode of web authentication. In the case hereof, the message indicating a successful authentication of the user sent by the portal server to the first module carries the information of the user's accessing mode. The information is stored in the shared memory by the first module; therefore, the second module can determine the user's accessing mode by reading the information in the shared memory. In the case hereof, besides the web authentication mode, the accessing modes further includes a Point-to-Point Protocol over Ethernet (PPPoE) dial mode and a narrow band access mode. In the case of the PPPoE dial mode and the narrow band access mode, the small window displays the basic access information, for instance, the access duration; the small window provides no button of "Log in the portal server with access user name", but displays an "Exit" button which is different from the "Log-off" button in the web authentication mode. In this step, if it decides to access the network in the web authentication mode, proceeds to Step 302; otherwise, proceeds to step 316. In Step 316, the small window displays the information associated with the access mode, and then performs an existing processing flow corresponding to the access mode.

In Step 302, the second module sends a handshaking message. If it is triggered for the first time, a message requesting for creating user information will be sent. And if it is not triggered for the first time, but the returned code of the common handshaking message is a message demanding to send a message for creating user information, a message requesting for creating user information will be sent as well. The information of message type that may signify the handshaking message is an ordinary handshaking message, or a message for creating user information, or a log off message, is carried in the handshaking message.

In Step 303, upon receiving the handshaking message, the portal server determines whether the handshaking message is for creating user information; if yes, adds a user record into a database and adds a user record into an on-line user data link list of the portal server in Step 304, and then proceeds to Step 309. In the case of an ordinary handshaking message, the portal server searches the user record in the on-line user data link list in Step 305 and determines whether the user record has been found. If the user record has not been found, returns to the second module a message for creating user information in Step 306. If the user record has been found, proceeds to Step 307.

In Step 307, the portal user determines whether the off-line reason of the user in the user record is blank, and if yes, proceeds to Step 308. Otherwise, proceeds to Step 309. The off-line reason of the user in this case is recorded in the user record in the on-line user data link list which is associated with the user. If the portal server receives from the BRAS a message that the user has been forced to be off-line, the portal server sets the off-line reason of the user to be as forced off-line, and otherwise keeps it blank as the initial value.

In Step 308, the portal server clears the user record in the database, and sends to the second module a handshaking response message signifying a failure, which carries the off-line reason of the user.

In Step 309, the portal server clears the failure times of the user's handshaking, and returns to the second module a handshaking response message signifying a success. The value of handshaking failure times in the case hereof is recorded in a memory of the portal server, whose initial value is zero. If the portal server fails to receive the handshaking message from the client within a specified time, adds 1 to the value of handshaking failure times.

In Step 310, the second module decides whether it has received the handshaking response message in a preset period of time; and if yes, proceeds to Step 311, otherwise, proceeds to Step 314.

In Step 311, the second module clears the failure times. The failure times in the case hereof refers to the times that the second module has failed to receive the handshaking response message within the preset period of time, whose initial value is zero. As is explained in detail in the description hereinafter, the failure times increases by 1 every time the second module fails to receive the handshaking response message in the preset period of time.

In Step 312, the second module determines whether the handshaking response message signifies a success; if yes, returns to Step 302 after a preset interval, i.e., sends a handshaking message to the portal server once again; if the handshaking response message is for creating user information, a special handshaking message for creating the user information will be sent again in Step 302. If the second module determines that the handshaking response message signifies a success but there is an off-line reason in it (signifying the user has been forced to be off-line), or the second module fails to receive the handshaking response message from the portal server in the preset period of time, the second module stops handshaking message delivering in Step 313 and displays to the user the off-line reason in the small window, and shuts the small window once the user confirms it.

The handshaking response message in the case hereof carries a response result value, for instance, a value signifying a success or a failure, and it may further carry the failure reason when the value signifies a failure.

In Step 314, the second module sets a period of waiting time for sending the handshaking message next time when deciding that it has not received the handshaking response message in the preset period of time. The waiting time in the case hereof is shorter than the time interval for sending the handshaking message in normal cases. Then, the second module adds 1 to the handshaking failure times.

In Step 315, the second module determines whether the failure times exceed the preset maximum failure times; and if yes, proceeds to Step 313, i.e., stops the user from using the data service, and notifies the user the off-line reason. If the value of the maximum failure times has not been reached yet, proceeds to Step 302 again, and sends to the portal server a handshaking message once more after the period of waiting time.

The above flow includes the procedure when the network ceases the user's utilization of the data service, the procedure when the user initiatively gets off-line and the procedure when the user is turned off-line because of network interruption. In light of the first case, when the ISCC of the network side discovers that the user is unable to use the data service due to a certain cause, the ISCC sends to the BRAS a message and the BRAS sends to the portal server a message, and then the portal server sets the off-line reason of the user in the user record to a non-blank value. Therefore, when the next handshaking message arrives, the portal server returns to the client a response message signifying a failure when it detects the non-blank value. With the off-line reason carried in the message, the client application determines in Step 312 that the response signifies a failure after it receives the handshaking response message, and notices the user that the utilization of the data service has been ceased and then closes the small window in Step 313.

In light of the second case, when the user gets off-line initiatively, the second module sends a special handshaking message, i.e., sets in the message type that the message signifies an off-line message; the portal server interacts with the BRAS and returns to the second module a message of a successful off-line. Therefore, the client application determines in Step 312 that the user cannot go on accessing the network after it receives the handshaking response message, and ceases the user's utilization of the data service and shuts the small window in Step 313.

In light of the third case, in Step 310, if the second module determines that it has failed to receive the handshaking response message from the portal server within the preset period of time, it means that a failure has occurred in network connection. In such a case, the second module may continue to carry out Step 313 so as to get the user off-line and shut the small window. Of course, the value of maximum failure times and resending a handshaking message may also be set as illustrated in the figure. In actual applications, this procedure can be added or deleted according to the demand.

Figure 4:
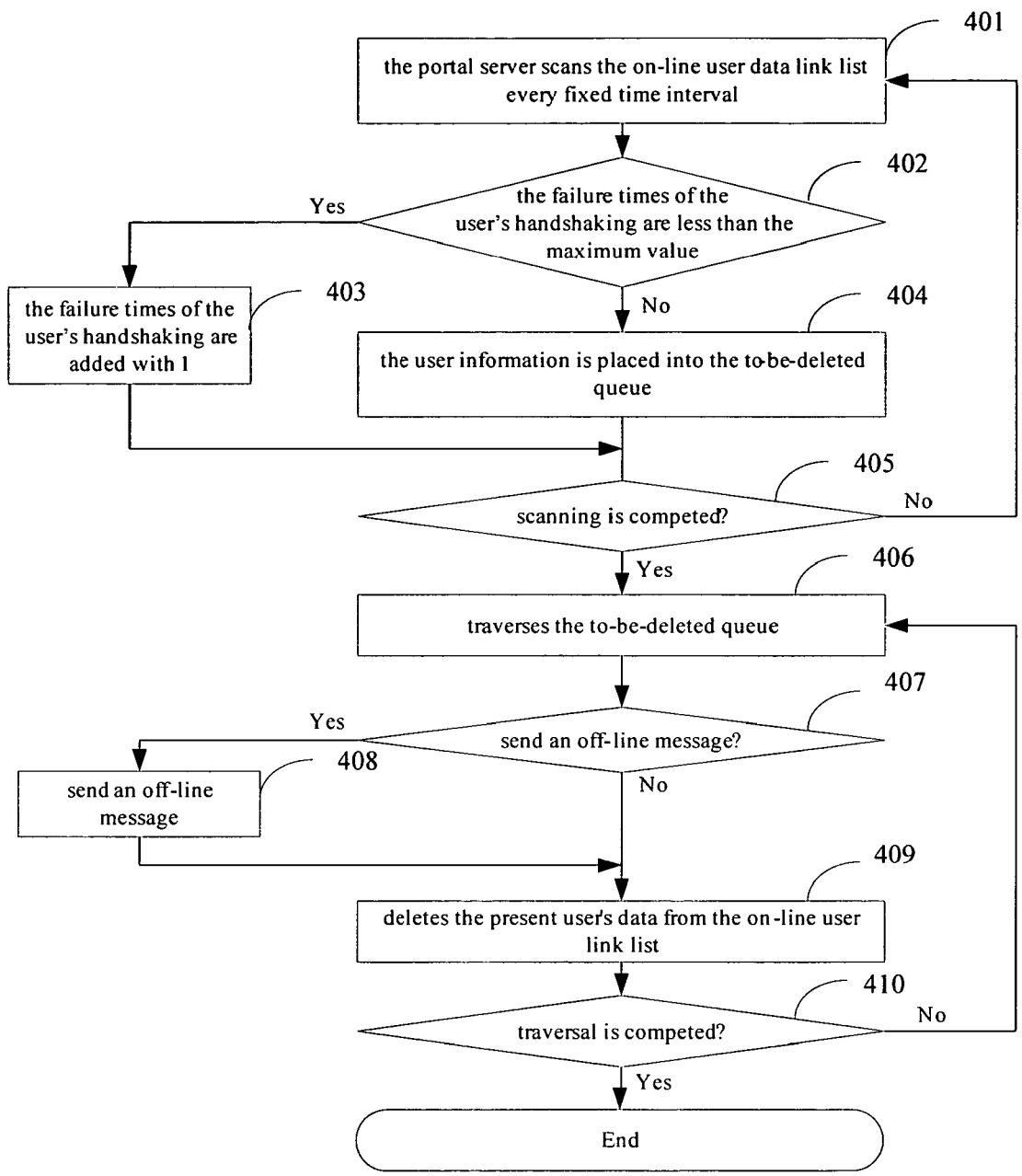
FIG. 4 is a processing flow of a portal server when a network connection is abnormal.

FIG. 4 illustrates a processing flow of the portal server when the network connection is abnormal. As is shown in FIG. 4, in Step 401, the portal server scans the user records in the on-line user data link list periodically.

In Step 402, while scanning one user record, the portal server decides whether the value of the failure times of the user's handshaking in the user record is less than the maximum value. If yes, proceeds to Step 403. And otherwise, proceeds to Step 404. As mentioned above, the portal server clears the handshaking failure times when it receives the user's handshaking message normally and does not carry out Step 403. In other words, the purpose is for checking whether an abnormal network connection exists.

In Step 403, the value of the failure times of the user's handshaking is added with 1.

In Step 404, the user record is placed into the to-be-deleted queue.

In Step 405, decides whether the scanning of the on-line user data link list is competed, i.e., whether all the user records in the on-line user data link list has been traversed; and if yes, proceeds to Step 406; otherwise, returns to Step 401 again, i.e., searches the next user record.

In Step 406, the portal server traverses the to-be-deleted queue.

In Step 407, while scanning one user record in the to-be-deleted queue, the portal server decides whether it is necessary to send an off-line message. In the cluster service, a plurality of portal servers may provide data service to the same user, therefore, the present portal server might concludes that it has received no handshaking signals from the user in a long period of time, but in fact, the user is accessing the data service via another portal server. So, the present portal server should determine whether there is another portal server providing data service to the user by retrieving the user record in the database; if yes, not proceeds to Step 408, i.e., it will not send the off-line message to the user. Instead, proceeds to Step 409 directly, i.e., delete the present user's data from the on-line user data link list. If no other portal server is providing data service to the user, proceeds to Step 408, i.e., an off-line request is sent to the BRAS, and then proceeds to Step 409. In the case hereof, the determination whether another server is providing data service to the user refers to comparing whether the IP address of the portal server currently used by the user in the database is the same as its own IP address. If yes, it means that no other portal server is providing service to the user; otherwise, it means that another portal server is providing service to the user.

In Step 410, decides whether the traversal of the to-be-deleted queue has been completed. If yes, terminates the flow. Otherwise, returns to Step 406, that is, decides whether it is necessary to send an off-line message for the next user information.

A description for the present invention is provided with a specific embodiment. It shows that the present invention is able to support a cluster service. Besides Step 407 shown in FIG. 4 which is for the purpose of the cluster service, the response message returned by the portal server for creating user information and the message sent to the portal server by the small window for creating user information can well support the cluster service shown in FIG. 3. To be specific, in the case that a plurality of portal servers provide data service to the same user, if the user transfers from the first portal server to the second portal server to access the broadband data network, the second portal server will find that there is no record of the user in the on-line user link list stored in its memory, therefore, it returns a message to the client for creating the user information. The small window at the client sends to the second portal server a message for creating the user information after it receives the message. So the second portal server can continuously provide data access service to the user.

In the present invention, the shared memory which can be accessed by both the first and second module is set, and all the information associated with the user's accessing the broadband data intelligent network is written in the memory. Since information in the shared memory is not stored in a document format, the loss caused by the user's improper operation is avoided, and attacks from network hikers are effectively prevented and therefore the security of data application is dramatically enhanced.

After obtaining the IP address of the computer, the first module sends the obtained IP address to the ISCC via the portal server requesting for the user information; if the ISCC decides that the user has not been successfully authenticated, the portal server generates a page for the user to input the user name and password; otherwise, the first module directly triggers the second module to operate. In this way it can be ensured that at every client, only one user is able to log in the portal server, and the implementation is simple and stable.

Moreover, the present invention adds a processing flow for the cluster service in the processing flow of the client and portal server. For example, while traversing the to-be-deleted queue, the portal server is able to decide whether to send the off-line message by comparing whether the portal server IP address of the user information in the database is the same as its own IP address. Therefore, in the case of the cluster service, although the portal server discovers that it has received no handshaking message from the client, the portal server can find that the client is sending a handshaking message to another portal server by checking the database shared by a plurality of portal servers. Thus it needs not send the off-line message to the NRAS, instead, it should directly delete the user information from the to-be-deleted queue. Because the client receives no off-line message from the portal server, the client is able to use the data service in a normal way via another portal server. Compared to the existing technological solution, this special processing flow ensures that the present invention is able to support the cluster service.

The foregoing description is only preferred embodiments of this invention and is not for use in limiting the protection scope thereof. All the modifications, equivalent replacements or improvements in the scope of the present invention's sprit and principles shall be included in the protection scope of the present invention.

What is claimed is:

1. A method for producing a small window at a client in a broadband data intelligent network, the broadband data intelligent network comprising the client and a portal server, the method comprising:
pre-setting a first module and a second module at the client;
when a user needs to use a data service of the broadband data intelligent network, obtaining, by the first module, the IP address of the client, and sending the IP address and authentication information input by the user to the portal server;
upon receiving a past authentication message from the portal server, the first module making the second module to operate;
generating, by the second module, the small window at the client to display access information of the client and provide the user with operation buttons;
controlling the user's usage of the data service with the small window, comprising:
sending, by the second module, handshaking messages periodically to the portal server, wherein the portal server is configured to:
set an off-line reason of the user in a user record to a non-blank value after receiving a forced off-line message from an Integrated Service Control Center (ISCC) or a message from the client indicating the user has actively logged off;
check whether an off-line reason of the user in the user record of a database is blank;
if yes, return to the second module a handshaking successful response message; and
otherwise, return to the second module a handshaking failed response message; and
continuing to send handshaking messages periodically to the portal server by the second module in the case of receiving the handshaking successful response message, or ceasing the user's access of the data service and displaying the off-line reason of the user in the small window by the second module in the case of receiving the handshaking failed response message.

2. The method according to claim 1, further comprising:
pre-setting a shared memory at the client, which can be accessed by both the first module and the second module.

3. The method according to claim 2, wherein,
upon receiving the message indicating that the authentication has been successful from the portal server, the first module writes a piece of information associated with the data service accessed by the user into the shared memory; and
the second module reads the access information of the user from the associated information in the shared memory, and displays the access information of the user in the small window.

4. The method according to claim 1, further comprising:
after obtaining the IP address of the client, sending, by the first module, the IP address of the client to the ISCC via the portal server requesting for the user information; and
if the ISCC determines that the user has not been successfully authenticated, generating, by the portal server, an authenticating page for the user to input a name and a password of the user; and otherwise, directly making, by the first module, the second module to operate.

5. The method according to claim 1, further comprising:
re-sending a handshaking message by the second module, once the second module fails to receive the handshaking response message from the portal server within a preset period of time; and
displaying an abnormal network connection in the small window by the second module, if the second module still fails to receive the handshaking response message after re-sending the handshaking message for preset times.

6. The method according to claim 1, further comprising:
searching a user record in an on-line user link list by the portal server, upon receiving the handshaking message from the client;
checking, by the portal server, whether the off-line reason in the user record of the database is blank, if the portal server finds the user record;
returning, by the portal server, to the second module a response message for creating the user information, if the portal server fails to find out the user record; and
sending, by the second module, to the portal server a handshaking message for creating the user information, upon receiving the response message.

7. The method according to claim 1, further comprising:
before sending the handshaking message, determining whether the data service is accessed by a web authentication mode, if yes, carrying out the steps of sending the handshaking messages; and otherwise, displaying a message corresponding to the access mode of the user in the small window directly.

8. The method according to claim 1, further comprising:
scanning the user records in the on-line user data link list periodically by the portal server;
placing the user record relating to the client in a to-be-deleted queue, if the portal server fails to receive the handshaking message from the client;
traversing the user records in the to-be-deleted queue; and
sending to each client relating to the user records in the to-be-deleted queue an off-line message and deleting the user records from the on-line user data link list.

9. The method according to claim 8, further comprising:
presetting a maximum value of failure times for handshaking;
changing failure times of handshaking if no handshaking message is received from the client within a preset period of time; and
placing the user record relating to the client into the to-be-deleted queue, when the value of the failure times of handshaking equals to the preset maximum value.

10. The method according to claim 8, further comprising:
before sending an off-line message to the user, determining whether it is necessary to send an off-line message to the client, if yes, carrying out the steps of sending the off-line message; otherwise, deleting the user record relating to the client from the on-line user data link list directly.

11. The method according to claim 10, wherein, the step of determining whether it is necessary to send the off-line message to the client comprises:
comparing whether the portal server's IP address of the user record in the database is the same as its own IP address.

12. The method according to claim 1, wherein, the first module and the second module are integrated in the client of the user.

* * * * *